(12) United States Patent
Eschenbeck et al.

(10) Patent No.: US 12,145,244 B2
(45) Date of Patent: Nov. 19, 2024

(54) TRANSMISSION ASSEMBLY COMPRISING A TRANSMISSION HOUSING AND A RECEIVING SPACE FOR RECEIVING AN ELECTRONIC AND/OR ELECTRICAL FUNCTIONAL UNIT

(71) Applicant: ZF Friedrichshafen AG, Friedrichshafen (DE)

(72) Inventors: Linus Eschenbeck, Wangen (DE); Florian Pöhnlein, Stefansfeld (DE); Daniel Haase, Friedrichshafen (DE); Michael Mueller, Ravensburg (DE); Christof Röck, Salem (DE); Nikolaus Taschner, Bayreuth (DE); Jens Hereth, Kulmbach (DE); Paul Kister, Höchstadt a.d. Aisch (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 109 days.

(21) Appl. No.: 18/045,668

(22) Filed: Oct. 11, 2022

(65) Prior Publication Data
US 2023/0110610 A1    Apr. 13, 2023

(30) Foreign Application Priority Data
Oct. 11, 2021 (DE) .................. 102021211414.8

(51) Int. Cl.
*B25B 27/14* (2006.01)
*B25B 27/00* (2006.01)
(Continued)

(52) U.S. Cl.
CPC .......... *B25B 27/16* (2013.01); *B25B 27/0042* (2013.01); *F16H 57/029* (2013.01);
(Continued)

(58) Field of Classification Search
CPC .... F16H 57/029; F16H 57/031; F16H 57/032; F16H 2057/0062; B25B 27/0042; B25B 27/16

See application file for complete search history.

(56) References Cited

U.S. PATENT DOCUMENTS 1,804,935 A  *  5/1931  Jacobus ................. B23P 19/00
                                                 29/239
4,015,324 A  *  4/1977  Lutter ..................... B25B 27/16
                                                 29/239
(Continued)

FOREIGN PATENT DOCUMENTS

CN       105782414 A   *  7/2016
DE          4316889 A1  * 11/1994  ........... B25B 27/023
(Continued)

OTHER PUBLICATIONS

Machine translation of DE 10058177 C1 obtained on Mar. 28, 2024.*
(Continued)

*Primary Examiner* — Adam D Rogers
(74) *Attorney, Agent, or Firm* — Crowell & Moring LLP

(57) ABSTRACT

A transmission assembly may include a transmission housing; and a receiving space for receiving an electrical functional unit. The receiving space may be formed by at least one wall in the transmission housing and a lid unit, the receiving space may be sealable from an exterior environment via a seal in a contact region on the transmission housing and the lid unit. The lid unit may be connectable to the transmission housing by a screw, where the lid unit includes a channel through which at least part of the screw passes, and where the channel has an inner thread section.

17 Claims, 3 Drawing Sheets

(51) Int. Cl.
  *B25B 27/16* (2006.01)
  *F16H 57/02* (2012.01)
  *F16H 57/029* (2012.01)
  *F16H 57/031* (2012.01)
  *F16H 57/00* (2012.01)
  *F16H 57/032* (2012.01)

(52) U.S. Cl.
  CPC ... *F16H 57/031* (2013.01); *F16H 2057/0062* (2013.01); *F16H 57/032* (2013.01)

(56) References Cited

U.S. PATENT DOCUMENTS

| | | | | |
|---|---|---|---|---|
| 4,610,064 A | * | 9/1986 | Verstraeten | F16L 23/006 29/256 |
| 4,671,324 A | * | 6/1987 | Neill | B25B 27/16 138/44 |
| 5,220,854 A | * | 6/1993 | Allart | F16H 57/027 74/606 R |
| 6,112,396 A | * | 9/2000 | Steinbock | F16B 31/04 411/917 |
| 10,539,225 B2 | * | 1/2020 | Nakano | H02K 5/203 |
| 10,760,669 B2 | * | 9/2020 | Herzel | F16H 57/02 |
| 2015/0224611 A1 | * | 8/2015 | Wojciechowski | B25B 27/16 29/256 |

FOREIGN PATENT DOCUMENTS

| | | | | |
|---|---|---|---|---|
| DE | 19529736 A1 | * | 2/1997 | ......... B25B 27/023 |
| DE | 100 58 177 C1 | | 7/2002 | |
| EP | 1911995 A2 | * | 4/2008 | ......... F16H 57/029 |
| WO | WO-2016120472 A1 | * | 8/2016 | ............... B60K 1/00 |

OTHER PUBLICATIONS

Machine translation of CN 105782414 A obtained on Mar. 28, 2024.*

Office Action dated May 9, 2022 for German Patent Application No. 10 2021 211 414.8 (14 pp.), note: pp. 1 and 2 are English language Explanations to Section C. Result of Determination Document.

* cited by examiner

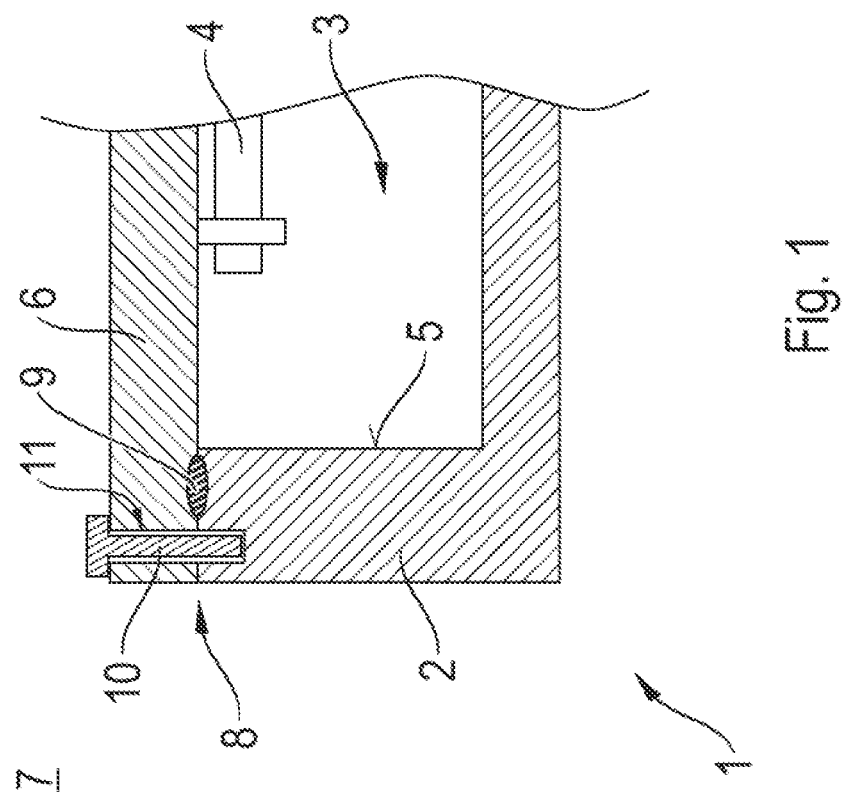

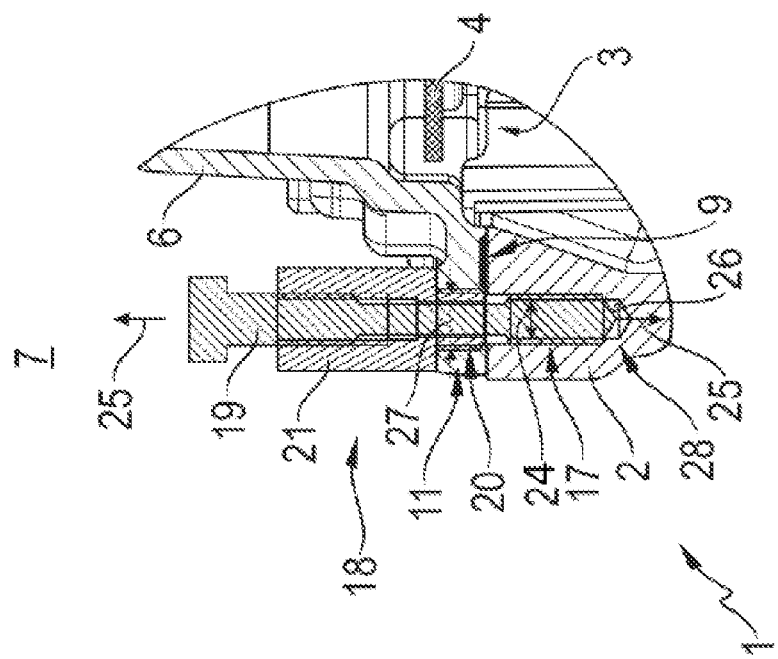
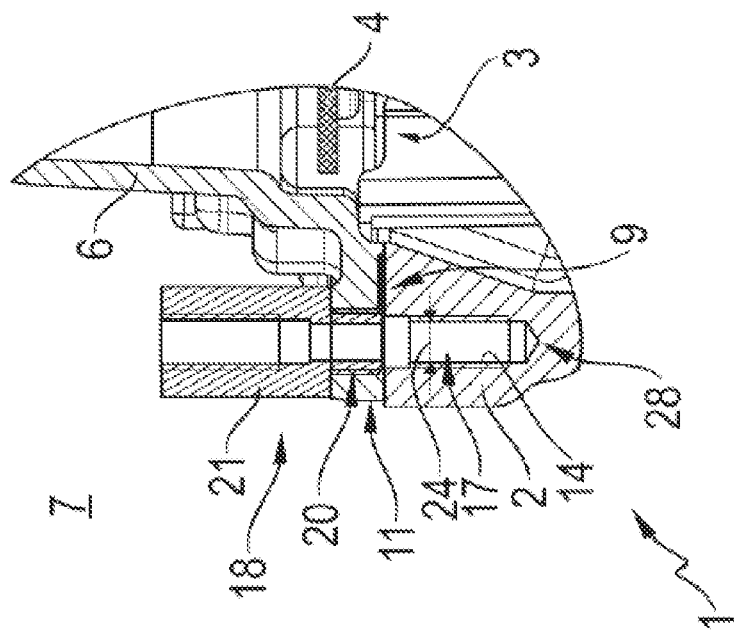
Fig. 2c
Fig. 2d

TRANSMISSION ASSEMBLY COMPRISING A TRANSMISSION HOUSING AND A RECEIVING SPACE FOR RECEIVING AN ELECTRONIC AND/OR ELECTRICAL FUNCTIONAL UNIT

RELATED APPLICATION

This application claims the benefit of, and priority to, German Patent Application DE 10 2021 211 414.8, filed Oct. 11, 2021, which is hereby incorporated by reference herein in its entirety.

TECHNICAL FIELD

The invention relates to a transmission assembly comprising a transmission housing and a receiving space for receiving an electronic and/or electrical functional unit.

BACKGROUND

Transmission assemblies of this type are fundamentally known from the prior art. It is thus known to place a control unit in a space formed by a transmission housing and a lid unit. It is also known to place a seal in the area separating the lid unit and the transmission housing, in order to seal the space against the environment. The lid unit is typically secured in place on the transmission housing with screws. Over time, the lid unit may become materially bonded to the transmission housing, such that after loosening and removing the screws securing the lid unit to the transmission housing further effort is required to remove the lid unit from the transmission housing.

BRIEF DESCRIPTION OF THE DRAWINGS

The invention shall be explained in greater detail in reference to exemplary embodiments shown in the drawings. Therein:

FIG. 1 shows a schematic illustration of a transmission assembly comprising a receiving space for an electronic and/or electrical functional unit formed by a transmission housing and a lid unit according to the invention;

FIG. 2*c* shows a schematic illustration of a removal tool secured to the lid unit according to one embodiment;

FIG. 2*d* shows a schematic illustration a removal tool with separating means according to one embodiment.

DETAILED DESCRIPTION

Figure 2B:
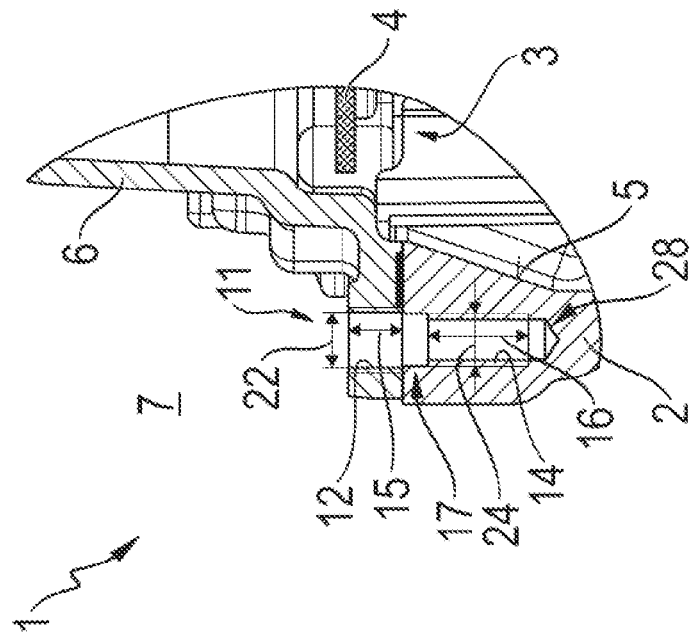
FIG. 2*b* shows a schematic illustration of the transmission assembly in FIG. 2*a*, without the screw.
Figure 2A:
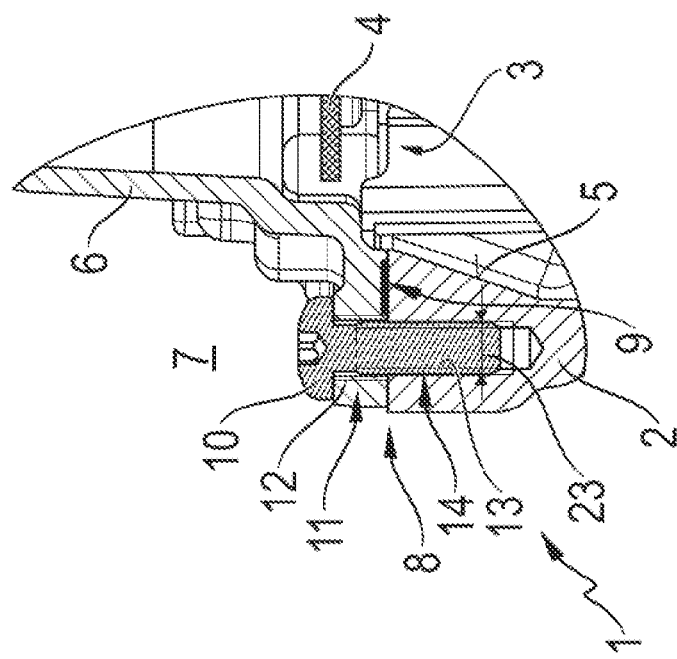
FIG. 2*a* shows a schematic illustration of a lid unit secured to a transmission housing with a screw.

In view of the background above, one object of the present disclosure is to create an inexpensive transmission assembly that enables removal of the lid unit in a simple and reliable manner. Releasing the lid unit from the transmission housing is enabled in a simple and convenient manner, despite any seal that forms a material bonding component.

One non-limiting primary embodiment includes a transmission assembly. The transmission assembly comprises a transmission housing and a receiving space for receiving an electronic and/or electrical functional unit, wherein the receiving space is formed by at least one wall in the transmission housing and a lid unit. The electronic and/or electrical functional unit can comprise an electrical printed circuit board, for example, which is attached to the transmission housing or the lid unit. By forming the receiving space in part by the lid unit and in part by the transmission housing, the electronic and/or electrical functional unit can be placed in the receiving space such that it is protected. The transmission housing can house a transmission in a drive train for a vehicle, in particular a motor vehicle. In particular, the transmission can be part of a vehicle drive train, or integrated in such, which transfers a rotational movement generated by an internal combustion engine and/or an electric motor to the at least one drive axle in the vehicle.

The receiving space is or can be sealed against the environment under an at least partial placement and/or formation of a seal in a region where the transmission housing comes in contact with the lid unit. The electronic or electrical functional unit received in the receiving space can therefore be at least partially, in particular entirely, sealed against the environment in the receiving space in a gas and/or liquid tight manner. The lid unit can be or is joined to the transmission housing with a screw. This screw can be formed by a threaded shaft and a head, which has a diameter that is greater than the shaft, in particular. The lid unit also has a channel for the screw, in particular for part of the shaft thereof. The important thing here is that at least part of, and in particular all of the channel in the lid unit has an inner thread section. A removal tool can be temporarily screwed into this inner thread section when the tool has an outer threading corresponding to the inner thread section in the lid unit. As a result, the removal tool can be threaded into the empty channel in the lid unit when the screw has been removed.

It may be useful for the threaded hole in the transmission housing to be a blind hole. The screwing of the lid unit to the transmission housing can also be a type of tightening screw connection for the intended use of the transmission or transmission assembly in which the transmission housing has an inner threading or region with an inner threading in which the shaft of the screw is received after passing through a hole in the lid unit.

The inner thread section of the channel in the lid unit may have an inner diameter that is greater than the outer diameter of the outer threading on the screw that is placed therein in the assembled state. As a result, when the lid unit is secured in the intended manner to the transmission housing, the at least one screw that is used for this and which passes at least in part through the channel is not engaged, i.e. not in a threaded engagement, with the inner thread section in the lid unit. As a result, the initial placement of the screw in the channel can be linear, and does not require a turning corresponding to the threads, for the screw to be axially inserted, at least until the screw enters the inner thread region in the hole in the transmission housing.

The inner thread section in the channel in the lid unit can have an inner diameter, for example, that is greater than the inner diameter of the inner thread region in the transmission housing for receiving the screw. In other words, the inner diameter of the inner thread section in the lid unit is such that the screw cannot be screwed into it. Instead, the screw can be inserted or placed therein without rotating it. As a result, the screw can be inserted with an exclusively linear movement through the threaded hole in the lid unit, and then screwed into an inner thread region in the transmission housing that corresponds to the channel in the lid unit. The inner thread section in the lid unit therefore has a greater inner diameter than the inner thread region in the transmission housing. The inner thread section in the lid unit can have an inner diameter, in particular a core diameter that is at least 0.20 mm, preferably at least 0.35 mm, particularly preferably at least 0.65 mm, more preferably at least 0.75 mm, and even more preferably at least 1.00 mm greater than the diameter of the inner thread region in the transmission housing. The core diameter of the inner thread section in the lid unit can therefore have an M10 inner threading, and the core diameter of the inner thread region in the housing can have an M8 inner threading.

The inner threading in the inner thread section in the lid unit and the inner threading in the inner thread region in the transmission housing for receiving the screw can be different. As such, the inner threading in the inner thread section in the lid unit and in the inner thread region in the transmission housing can differ in terms of (a) the thread flank, and/or (b) the flank angle, and/or (c) the turning direction of the thread, and/or (d) the length, and/or (e) the slope of the thread, and/or (f) the division of the at least one thread in the form of a multiple thread. There is preferably at least one difference with regard to the core diameter and at least one or more of the other differing characteristics (a) to (f). These differences can lead to a simplified operation and/or simplified placement of the screw and/or the removal tool, because an unintended connection of the screw and/or the removal tool to some point on the lid unit and/or the transmission housing is prevented, e.g. through implementation of the "poka-yoke" principle.

It is also possible for the axial length of the inner thread section in the lid unit to be no more than half, preferably one third, particularly preferably a quarter, more preferably a fifth, and even more preferably a sixth of the axial length of the inner thread region in a hole in the transmission housing for securing the lid unit thereto with the screw. This means that the section of the lid unit with the inner threading can be thinner on the whole, because the inner thread section in the lid unit is only used temporarily for securing the removal tool thereto, and does not have to endure any of the typical loads for the intended use of the transmission assembly, in particular for securing the lid unit to the transmission housing. As a result, the axial length of the inner thread section in the lid unit can be a maximum of 16 mm, preferably 11 mm, particularly preferably 9 mm, and more preferably no longer than 7 mm. In particular if the lid unit is made at least in part, preferably entirely, of a light metal, e.g. aluminum, the aforementioned maximum axial lengths of the inner thread section in the lid unit are sufficient for the temporary securing of a removal tool.

The seal can be at least partially, in particular entirely, made of, or comprise, a plastic. In particular, the seal can be at least partially, in particular entirely, made of silicon and/or polyurethane. Alternatively or additionally, the seal can be at least partially, in particular entirely, in the form of a "Formed In Place Gasket" (FIPG) and/or a "Formed In Place Foam Gasket" (FIPFG). The seal can be applied to the sealing region as a liquid, or it can comprise a liquid seal.

In addition to the transmission assembly, the invention also relates to a removal tool for disassembling a transmission assembly, in particular the transmission assembly described herein, in which the removal tool comprises (a) an outer thread region that can be temporarily connected to, in particular screwed into, the inner thread section in the lid unit and (b) a separating means to remove the lid unit by applying a separating pressure to the transmission housing. This separating means can be in the form of a dome, for example, which can move longitudinally in a base element in the removal tool. In general, the separating means can move in the base element in the removal tool along a linear path, such that the separating means rotates about its own axis (e.g. longitudinal axis) as it moves along the linear path, in the direction that would screw it into a hole. The separating means could also move in a linear direction without rotating.

The separating means can form a screw element that can rotate in or on the removal tool, in particular in the direction for screwing it into or out of a hole, wherein an axis of a receiving zone for the removal tool in the intended use thereof is coaxial to an inner thread region in the transmission housing for receiving the separating means. The axis of the receiving zone for the removal tool can be its central axis and/or axis of symmetry and/or rotational axis and/or central longitudinal axis. The receiving zone can have an inner or outer threading, at least in part, which corresponds to an outer or inner threading in or on the separating means.

The invention also relates to a lid unit that forms part of a receiving space for the transmission assembly comprising the transmission housing described herein.

The invention also relates to a method for removing a lid unit from a transmission housing, in particular the for the transmission assembly described herein, in which the lid unit and the transmission housing form or define a receiving space for at least partially, in particular entirely, receiving an electronic and/or electrical functional unit, and the lid unit is secure to the transmission housing with a screw that passes through a channel formed in the lid unit and is screwed into a region formed in the transmission housing with an inner threading. The method also comprises the following steps: (a) removing (releasing), in particular unscrewing, the screws from the transmission housing forming the connection with the lid unit, (b) connecting a removal tool with an outer threading to the lid unit in the section with the inner threading, wherein the inner thread section in the lid unit has a greater diameter than the inner thread region in the transmission housing, (c) applying a separating pressure with the removal tool in order to break the lid unit away from the transmission housing, in that a separating means applies pressure to the transmission housing. In other words, the removal tool temporarily secured to the lid unit can apply pressure to the transmission housing by extending the separating means in the removal tool toward the transmission housing, thus applying a separating pressure thereto, such that the lid unit is separated therefrom, even if a material bond has been formed between the two by the seal.

The separating means, or the means for applying pressure, in the removal tool can be screwed at least partially, in particular entirely, into a base element on the removal tool while it applies pressure to the transmission housing. This enables the separating means to rotate. Alternatively or additionally, the separating means, or means for applying pressure, can enter a hole in the transmission housing, which comprises the inner threading, with a part, in particular in the form of a rod, and/or at least partially, preferably entirely, protrude therein (in relation to the depth of the hole). This allows for the separating means, or means for applying pressure, to bear on the base of the hole comprising the inner thread region, which forms a blind hole, and thus apply pressure thereto. In other words, the separating means is placed so far into the hole in the transmission housing that a removal force or separating pressure is applied to the boundary between the lid unit and the transmission housing due to the contact of the separating means with the base of the blind hole in the transmission housing, which results in a separation of the lid unit from the transmission housing, despite any connecting strength, in particular adhesion, formed by the seal.

The separating means, or means for applying pressure, in the removal tool can be at least partially, in particular entirely, screwed into a base element in the removal tool while pressure is being applied to the transmission housing. This separating means can be rotated in doing so. Alternatively or additionally, the separating means, or means for applying pressure, can enter and/or extend at least partially, preferably entirely into, a hole in the transmission housing comprising the inner thread region (in relation to the depth of the hole) with a rod-shaped section while pressure is being applied. As a result, a contact surface on the separating means, or means for applying pressure, bears on the base of the blind threaded hole in the transmission housing while pressure is being applied. In other words, the separating means is placed deeply enough into the hole in the transmission housing that a separating pressure is formed at the seam between the lid unit and the transmission housing due to the contact between the separating means and the base of the blind hole in the transmission housing, which then separates the lid unit from the transmission housing, despite any adhesion formed by the seal.

The separating means or means for applying pressure in the removal tool can be actuated pneumatically and/or electrically and/or hydraulically to apply the separating pressure or removal force. As a result, the separating means can be moved by pneumatic and/or electric and/or hydraulic forces, such that the separating force can be applied to the transmission housing.

All of the advantages, details, explanations and/or features of the transmission assembly according to the invention can be applied to the removal tool, and/or the lid unit, and/or the method according to the invention, and vice versa.

Referring now to the figures, a transmission assembly 1 is shown in the drawings that comprises a transmission housing 2 and a receiving space 3 for receiving an electronic and/or electrical functional unit 4. The electronic and/or electrical functional unit can be secured to the lid unit 6 with a fastener, e.g. a screw, cf. FIG. 1. The receiving space 3 can be formed by at least one wall 5 in the transmission housing 2 and a wall section of the lid unit 6. The receiving space 3 can be or is sealed against the environment 7 or the region outside the receiving space 3 under an at least partial placement and/or formation of a seal 9 in a contact region 8 between the transmission housing 2 and the lid unit 6. The transmission housing 2 and the lid unit 6 have flat adhesive surfaces that are closer to the inside than the screw 10, facing the receiving space 3, on which a seal 9 is located. The adhesive surfaces can be substantially parallel surfaces in the fully assembled state.

The lid unit 6 is or can be connected with a screw 10 to the transmission housing in that the lid unit 6 contains a channel 11 through which at least part of the screw 10 can be inserted. In other words, the lid unit 6 and the transmission housing 2 are screwed together with the screw 10.

The channel 11 can at least partially contain an inner thread section 12, in particular through its entirety. The inner thread section 12 in the lid unit is formed over the entire length of the channel in the embodiment shown in FIG. 2b.

The inner thread section 12 in the lid unit channel 11 can have an inner diameter 22 that is greater than the outer diameter 23 of an outer threading 13 on the screw 10 in the region of the inner thread section 12 in the fully assembled state.

The inner thread section 12 on the channel 11 in the lid unit can also have an inner diameter 22 that is greater than the inner diameter 24 of an inner thread region 14 in the transmission housing for receiving the screw 10. This reliably prevents incorrect placement of the screw 10 and the removal tool 18.

The inner threading in the inner thread section 12 in the lid unit 6 and an inner threading in an inner thread region 14 in the transmission housing into which a screw 10 can be threaded can be different. The inner threading in the inner thread section 12 and the inner thread region 14 can differ in terms of, e.g. (a) the shape of the thread flank, and/or (b) the flank angle, and/or (c) the turning direction of the thread, and/or (d) the length 15, 16, and/or (e) the slope of the thread, and/or (f) the division of the at least one thread in the form of a multiple thread.

An axial length 15 of the inner thread section 12 in the lid unit can be at most one half, preferably at most one third, more preferably at most one fourth, very preferably at most one fifth, and more preferably at most one sixth of the axial length 16 of a hole 17 in the transmission housing 2 containing the inner thread region 14 for the screw 10. This results in both the possibility of securing the lid unit 6 and connecting the removal tool 18 despite the relatively thin material thickness of the lid unit 6 where the screw 10 is placed.

The seal 9 can be at least partially, in particular entirely or exclusively, made of plastic, and the seal 9 preferably contains, at least in part, in particular entirely or exclusively, silicon and/or polyurethane.

A removal tool 18 for disassembling a transmission assembly 1, in particular for disassembling the transmission assembly 1 described herein, is shown by way of example in FIGS. 2c and 2d. The removal tool 18 has an outer thread region 20 that is temporarily screwed into the inner thread section 12 in the lid unit, and (b) a separating means 19 for generating a separating pressure 25 between the transmission housing 2 and the lid unit 6 by applying pressure to the transmission housing 2 with the separating means 19. The separating pressure 25 is formed by a pressure acting on the base 28 of the hole 17 in the transmission housing formed by the separating means 19 (see reference symbol 25 at the base 28) and a resulting counterforce (see reference symbol 25 at the end of the separating means 19 facing away from the transmission housing 2). The removal tool 18 can thus comprise a base element 21 and a moving separating means 19 on the base element 21. The base element 21 can comprise the outer thread region 20 that is temporarily screwed into the lid unit 6 to secure the base element 21 and thus the removal tool 18 in place. This outer thread region 20 is thus accommodated in or screwed into the inner thread section 12 in the lid unit.

The invention also relates to a method for removing a lid unit 6 from a transmission housing 2, in particular a lid unit 6 from a transmission housing 2 in the transmission assembly 1 described herein. The lid unit 6 and transmission housing 2 form a receiving space 3 for receiving at least partially, in particular entirely, an electronic and/or electrical functional unit 4. The lid unit 6 is secured to the transmission housing 2 with a screw 10 inserted through a channel 11 in the lid unit and screwed into an inner thread region 14 in the transmission housing. The method comprises the following steps: (a) removing the screw 10 from the transmission housing 2 and the lid unit 6, (b) screwing an outer threading (e.g. the outer thread region 20) on the removal tool 18 into an inner thread section 12 in the lid unit 6, where the inner thread section 12 in the lid unit has a larger inner diameter 22 or core diameter than the inner thread region 14 in the transmission housing 2, (c) applying a separating pressure 25 with the removal tool 18 to push the lid unit 6 away from the transmission housing 2 in that the separating pressure 25 is or can be applied to the transmission housing 2 by a separating means 19, which results in a separating pressure acting between the lid unit 6 and the transmission housing 2, or a leads to a corresponding relative movement between these two parts 2, 6, respectively.

The separating means 19, which may have any suitable structure (such as a cylindrical elongated structure, optionally with multiple diameters), can have an outer diameter 27 or a maximum radial extension that is smaller than the inner diameter 24 of the inner thread region 14 where it extends into the inner thread region 14 in the hole 17 in the transmission housing 2, and/or enters the inner thread region 14, during the removal process. In other words, the outer diameter 27 of the separating means 19 in the region that is located at least partially, in particular entirely, in the interior of the inner thread region 14 during the removal process is smaller than the inner diameter 24 of the inner thread region 14 such that the threads in the inner thread region 14 cannot engage in the separating means 19. Optionally, the separating means 19 may include other features, such as threads, a tapered (e.g., wedge) surface, a screw cap or other head structure, a different cross-sectional shape (e.g., any polygon and/or curved profile), etc.

The separating means 19 can be at least partially, in particularly entirely, screwed into a base element 21 in the removal tool 18 while separating pressure 25 is applied to the transmission housing 2. Alternatively, the separating means 19 can execute a movement in relation to the base element 21 other than a screwing movement. In this case, the separating means 19 can at least partially, in particular entirely, execute a straight and/or rotating movement (or a combination of a straight and rotating movement).

The separating means 19 can enter or extend into a section of a hole 17 in the transmission housing comprising the inner thread region 14 while the separating pressure 25 is being applied. As a result, in an optional further development of the invention, a contact surface 26 on the separating means 19 can bear on the base 28 of the hole 17 in the form of a blind hole comprising the inner thread region 14 in the transmission housing 2. In other words, pressure is applied to the base 28 of the blind hole 17 in the transmission housing 2 by the separating means 19, which pushes the lid unit 6 away from the transmission housing 2.

The separating means 19 can be actuated pneumatically and/or electrically and/or hydraulically in order to apply the separating pressure 25.

LIST OF REFERENCE SYMBOLS 1 transmission assembly
2 transmission housing
3 receiving space
4 electrical and/or electronic functional unit
5 wall in 2
6 lid unit
7 environment
8 contact region
9 seal
10 screw
11 channel
12 inner thread section in 6
13 outer threading on 10
14 inner thread region in 2
15 length of 12
16 length of 14
17 hole in 2
18 removal tool
19 separating means on 18
20 outer thread region on 18
21 base element on 18
22 inner diameter of 12
23 outer diameter of 13
24 inner diameter of 14
25 separating pressure
26 contact surface on 19
27 outer diameter of 19
28 base region in 17

The invention claimed is:

1. A transmission assembly, comprising:
a transmission housing; and
a receiving space for receiving an electrical functional unit,
wherein the receiving space is formed by at least one wall in the transmission housing and a lid unit,
wherein the receiving space is sealable from an exterior environment via a seal in a contact region on the transmission housing and the lid unit,
wherein the lid unit is connectable to the transmission housing by a screw,
wherein the lid unit includes a channel through which at least part of the screw passes,
wherein the channel has an inner thread section, and
wherein the inner thread section in the channel in the lid unit has an inner diameter that is greater than an outer diameter of an outer threading on the screw in a region of the inner thread section in an assembled state.

2. The transmission assembly according to claim 1, wherein the inner thread section in the channel in the lid unit has an inner diameter that is greater than an inner diameter of an inner thread region in the transmission housing for receiving the screw.

3. The transmission assembly according to claim 1, wherein an inner threading in the inner thread section in the lid unit and an inner threading in an inner thread region in the transmission housing for the screw are different, and the inner threading in the inner thread section and the inner threading in the inner thread region differ in at least one of the following characteristics: a shape of a thread flank, a flank angle, a turning direction of the thread, a length, a slope of the thread, and a division of at least one thread in a form of a multiple thread.

4. The transmission assembly according to claim 1, wherein an axial length of the inner thread section in the lid unit is half, or less, of an axial length of a hole in the transmission housing that has an inner thread region for the screw.

5. The transmission assembly according to claim 1, wherein the seal contains silicon and/or polyurethane.

6. A removal tool for disassembling a transmission assembly according to claim 1, wherein the removal tool comprises:
an outer thread region that can be temporarily screwed into the inner thread section in the lid unit, and
a separating device for generating a separating pressure between the transmission housing and the lid unit by applying pressure to the transmission housing with the separating device.

7. A lid unit, which forms part of a receiving space of a transmission assembly comprising a transmission housing according to claim 1.

8. A transmission assembly, comprising:
a transmission housing; and a receiving space for receiving an electrical functional unit, wherein the receiving space is formed by at least one wall in the transmission housing and a lid unit, wherein the receiving space is sealable from an exterior environment via a seal in a contact region on the transmission housing and the lid unit, wherein the lid unit is connectable to the transmission housing by a screw, wherein the lid unit includes a channel through which at least part of the screw passes, wherein the channel has an inner thread section, and wherein the inner thread section in the channel in the lid unit has an inner diameter that is greater than an inner diameter of an inner thread region in the transmission housing for receiving the screw.

9. The transmission assembly according to claim 8, wherein an inner threading in the inner thread section in the lid unit and an inner threading in an inner thread region in the transmission housing for the screw are different, and the inner threading in the inner thread section and the inner threading in the inner thread region differ in at least one of the following characteristics: a shape of a thread flank, a flank angle, a turning direction of the thread, a length, a slope of the thread, and a division of at least one thread in a form of a multiple thread.

10. The transmission assembly according to claim 8, wherein an axial length of the inner thread section in the lid unit is half, or less, of an axial length of a hole in the transmission housing that has an inner thread region for the screw.

11. The transmission assembly according to claim 8, wherein the seal contains silicon and/or polyurethane.

12. A removal tool for disassembling a transmission assembly according to claim 8, wherein the removal tool comprises:
an outer thread region that can be temporarily screwed into the inner thread section in the lid unit, and a separating device for generating a separating pressure between the transmission housing and the lid unit by applying pressure to the transmission housing with the separating device.

13. A lid unit, which forms part of a receiving space of a transmission assembly comprising a transmission housing according to claim 8.

14. A method for removing a lid unit from a transmission housing, wherein the lid unit and the transmission housing form a receiving space for receiving an electronic functional unit, wherein the lid unit is secured in place on the transmission housing by a screw inserted at least in part through a channel in the lid unit and screwed into an inner thread region in the transmission housing, the method comprising:
unscrewing the screw from the transmission housing and lid unit;
screwing a removal tool with an outer threading into an inner thread section in the lid unit, wherein the inner thread section in the lid unit has a greater diameter than the inner thread region in the transmission housing; and
applying a pressure with the removal tool to separate the lid unit from the transmission housing,
wherein the pressure is applied to the transmission housing with a separating structure in the removal tool.

15. The method according to claim 14, wherein the separating structure is screwed into a base element in the removal tool while the pressure is being applied to the transmission housing.

16. The method according to claim 14,
wherein a portion of the separating structure extends into a hole in the transmission housing that includes the inner thread region while the pressure is being applied, and
wherein a contact surface on the separating structure contacts a base of the hole in the transmission housing, the hole being a blind hole, and the hole comprising the inner thread region.

17. The method according to claim 14, wherein the separating structure is actuated pneumatically or electrically or hydraulically to apply the pressure.

* * * * *